US012459096B2

(12) United States Patent
Fan et al.

(10) Patent No.: US 12,459,096 B2
(45) Date of Patent: Nov. 4, 2025

(54) POWERED FASTENER DRIVING TOOL HAVING FUEL/GAS MIXTURE COMPRESSED IGNITION

(71) Applicant: Illinois Tool Works Inc., Glenview, IL (US)

(72) Inventors: Chinbay Q. Fan, Chicago, IL (US); Patrick Talano, Chicago, IL (US)

(73) Assignee: Illinois Tool Works Inc., Glenview, IL (US)

( * ) Notice: Subject to any disclaimer, the term of this patent is extended or adjusted under 35 U.S.C. 154(b) by 190 days.

(21) Appl. No.: 18/455,312

(22) Filed: Aug. 24, 2023

(65) Prior Publication Data

US 2023/0398671 A1 Dec. 14, 2023

Related U.S. Application Data

(60) Continuation of application No. 17/144,725, filed on Jan. 8, 2021, now Pat. No. 11,752,610, which is a (Continued)

(51) Int. Cl.
*B25C 1/08* (2006.01)
*B25C 1/00* (2006.01)
*B25C 1/04* (2006.01)

(52) U.S. Cl.
CPC ................ *B25C 1/08* (2013.01); *B25C 1/008* (2013.01); *B25C 1/04* (2013.01)

(58) Field of Classification Search
CPC .. B25C 1/008; B25C 1/08; B25C 1/04; B25C 1/041; B25C 1/045; B25B 21/02; B25B 21/026

(Continued)

(56) References Cited

U.S. PATENT DOCUMENTS 4,188,858 A 2/1980 Plunkett
4,448,338 A 5/1984 Graf et al.

(Continued)

FOREIGN PATENT DOCUMENTS

DE 1274528 B 8/1968
DE 4243617 A1 6/1994
DE 10232035 A1 1/2004

OTHER PUBLICATIONS

European Examination Report for European Application No. 18 705 807.8, dated Nov. 9, 2020 (4 pages).

(Continued)

*Primary Examiner* — Scott A Smith
(74) *Attorney, Agent, or Firm* — Neal, Gerber & Eisenberg LLP

(57) ABSTRACT

Various embodiments provide a powered fastener driving tool including a spring/gas chamber configured to contain pressurized gas that causes a piston to compress a fuel/gas mixture, the mixture combusted to provide necessary levels of power for driving fasteners while using less fuel. One embodiment includes: a housing; a spring/gas chamber in the housing configured to contain pressurized gas; a dual compression/combustion chamber in the housing configured to contain a fuel/gas mixture; a gas communication channel in the housing fluidly connecting the spring/gas chamber and the dual compression/combustion chamber; a movable piston in the housing such that pressurized gas in the spring/gas chamber causes the piston to move in the housing to compress the fuel/gas mixture in the dual compression/combustion chamber; and a driving blade connected to the piston such that combustion of the compressed fuel/gas mixture causes the piston to move in the housing to cause the driving blade to drive a fastener.

14 Claims, 7 Drawing Sheets

Related U.S. Application Data division of application No. 15/890,668, filed on Feb. 7, 2018, now Pat. No. 10,898,995.

(60) Provisional application No. 62/461,989, filed on Feb. 22, 2017.

(58) Field of Classification Search
USPC ............................ 227/8, 10, 130; 123/46 SC
See application file for complete search history.

(56) References Cited

U.S. PATENT DOCUMENTS

| | | | |
|---|---|---|---|
| 4,554,861 A | 11/1985 | Gassner et al. | |
| 4,739,915 A | 4/1988 | Cotta | |
| 4,913,331 A | 4/1990 | Utsumi et al. | |
| 5,909,836 A | 6/1999 | Shkolnikov et al. | |
| 5,971,245 A | 10/1999 | Robinson | |
| 6,145,724 A | 11/2000 | Shkolnikov et al. | |
| 6,158,643 A | 12/2000 | Phillips | |
| 6,491,002 B1 | 12/2002 | Adams | |
| 6,634,325 B1 | 10/2003 | Adams | |
| 6,634,625 B1 | 10/2003 | Sudrot | |
| 6,830,017 B2 | 12/2004 | Wolf et al. | |
| 7,004,366 B2 | 2/2006 | Schiestl et al. | |
| 7,137,540 B2 * | 11/2006 | Terrell | B25C 1/047 227/8 |
| 7,243,829 B2 | 7/2007 | Oda et al. | |
| 7,316,341 B2 * | 1/2008 | Schnell | B25C 1/04 173/218 |
| 7,484,649 B2 * | 2/2009 | Schnell | B25C 1/008 173/168 |
| 7,673,779 B2 | 3/2010 | Moeller et al. | |
| 8,215,528 B2 | 7/2012 | Matsunaga et al. | |
| 8,544,710 B2 | 10/2013 | Tanaka | |
| 8,556,149 B2 * | 10/2013 | Schnell | B25C 1/04 173/218 |
| 8,561,869 B2 | 10/2013 | Towfighi | |
| 8,770,457 B2 | 7/2014 | Hamilton | |
| 9,226,686 B2 | 1/2016 | Blair | |
| 9,969,071 B2 | 5/2018 | Nitsche et al. | |
| 10,646,984 B2 | 5/2020 | Zhao et al. | |
| 10,781,566 B2 | 9/2020 | Paske | |
| 10,800,022 B2 | 10/2020 | Zhao et al. | |
| 10,843,318 B2 | 11/2020 | Kobori et al. | |
| 10,898,995 B2 | 1/2021 | Fan et al. | |
| 11,213,934 B2 | 1/2022 | Bandy et al. | |
| 11,752,610 B2 * | 9/2023 | Fan | B25C 1/008 227/10 |
| 2005/0184120 A1 * | 8/2005 | Terrell | B25C 1/04 227/8 |
| 2008/0237295 A1 | 10/2008 | Adams | |
| 2014/0090732 A1 | 4/2014 | Schieler et al. | |
| 2015/0102084 A1 | 4/2015 | Zhao | |
| 2018/0193990 A1 * | 7/2018 | Zhao | B25C 1/08 |
| 2018/0236645 A1 * | 8/2018 | Fan | B25C 1/08 |

OTHER PUBLICATIONS

International Search Report and Written Opinion for International Application No. PCT/US2018/017373, dated May 7, 2018 (11 pages).

* cited by examiner

POWERED FASTENER DRIVING TOOL HAVING FUEL/GAS MIXTURE COMPRESSED IGNITION

PRIORITY

This application is a continuation of, and claims priority to and the benefit of U.S. patent application Ser. No. 17/144,725, filed on Jan. 8, 2021, now issued as U.S. Pat. No. 11,752,610 on Sep. 12, 2023, which is a divisional of, and claims priority to and the benefit of U.S. patent application Ser. No. 15/890,668, filed on Feb. 7, 2018, now issued as U.S. Pat. No. 10,898,995 on Jan. 26, 2021, which claims priority to and the benefit of U.S. Provisional Patent Application Ser. No. 62/461,989, filed Feb. 22, 2017, the entire contents of which are incorporated herein by reference.

BACKGROUND

Powered fastener driving tools are well known and commercially widely used throughout the world. Powered fastener driving tools are typically electrically powered, pneumatically powered, combustion powered, or powder activated. Powered fastener driving tools are typically used to drive fasteners (such as nails, staples, and the like) to connect a first material, item, object, or workpiece to a second material, item, object, workpiece, or substrate.

Various known powered fastener driving tools typically include: (a) a housing; (b) a power source assembly or power supply assembly in, connected to, or supported by the housing; (c) a fastener supply assembly in, connected to, or supported by the housing; (d) a fastener driving assembly in, connected to, or supported by the housing; (e) a trigger mechanism partially in, connected to, or supported by the housing; and (f) a workpiece contactor or contacting element (sometimes referred to herein as a "WCE") connected to or supported by the housing. The WCE is configured to engage or contact a workpiece and to operatively work with the trigger mechanism such that the WCE needs to be depressed or move inwardly a predetermined distance with respect to the housing before activation of the trigger mechanism causes actuation of the powered fastener driving tool.

Powered fastener driving tools typically have two different types of operational modes and one or more mechanisms that enable the operator to optionally select one of the two different types of operational modes that the operator desires to use for driving the fasteners. One operational mode is known in the industry as the sequential or single actuation operational mode. In this operational mode, the depression or actuation of the trigger mechanism will not (by itself) initiate the actuation of the powered fastener driving tool and the driving of a fastener into the workpiece unless the WCE is sufficiently depressed against the workpiece. In other words, to operate the powered fastener driving tool in accordance with the sequential or single actuation operational mode, the WCE must first be depressed against the workpiece followed by the depression or actuation of the trigger mechanism. Another operational mode is known in the industry as the contact actuation operational mode. In this operational mode, the operator can maintain the trigger mechanism at or in its depressed position, and subsequently, each time the WCE is in contact with, and sufficiently pressed against the workpiece, the powered fastener driving tool will actuate, thereby driving a fastener into the workpiece.

As mentioned above, various known powered fastener driving tools are combustion powered. Many combustion powered fastener driving tools are powered by a rechargeable battery (or battery pack) and a replaceable fuel cell or cartridge. Various combustion powered fastener driving tools, battery packs, and fuel cells have been available commercially from ITW-Paslode of Vernon Hills, Illinois (a division of Illinois Tool Works Inc., the assignee of this application).

The fuel cell or cartridge supplies fuel. The battery provides energy for generating a spark to ignite the fuel. The battery powered spark ignites the fuel in a combustion chamber to generate high-pressure combustion gas or gases that cause the piston to move in the housing, which in turn causes a driving blade to drive a fastener dispensed from the fastener magazine or supply assembly.

Various known combustion powered fastener driving tools are more powerful than electrically powered, pneumatically powered, or powder activated powered fastener driving tools. Such more powerful combustion powered fastener driving tools are typically thus used for applications that require a larger amount of power, such as attaching a metal object to a concrete wall wherein the fastener has to be driven through the metal object and into the concrete wall.

There is a continuing need to provide more efficient high powered fastener driving tools that provide the same or greater power levels as known combustion powered fastener driving tools.

SUMMARY

Various embodiments of the present disclosure provide a combustion powered fastener driving tool (sometimes referred to herein as a powered fastener driving tool) including a housing, a piston in the housing, a first or spring/gas chamber in the housing, and a second or dual compression/combustion chamber in the housing. The spring/gas chamber is configured to be filled with and contain pressurized gas that causes the piston move within the housing to compress a fuel/gas mixture in the dual compression/combustion chamber prior to ignition of the mixture in that chamber. The compressed fuel/gas mixture is combusted to provide necessary levels of power for driving fasteners (such as nails).

In various embodiments, the combustion powered fastener driving tool of the present disclosure can be configured to: (1) use less fuel than other combustion power tools with similarly sized combustion chambers while providing the same amount of fastener driving force as such other combustion powered tools; (2) use the same amount of fuel as other combustion power tools with similarly sized combustion chambers while providing a greater amount of fastener driving force than such other combustion powered tools; and (3) provide the same or greater amount of fastener driving force as certain other known combustion power tools while being smaller in size and/or weight than such other known combustion power tools.

More specifically, in one example embodiment of the present disclosure, the powered fastener driving tool includes: (a) a housing; (b) a first or spring/gas chamber in the housing and configured to contain pressurized gas; (c) a second or dual compression/combustion chamber in the housing and configured to contain a fuel/gas mixture; (d) a gas communication channel in the housing and configured to selectively fluidly connect the spring/gas chamber and the dual compression/combustion chamber; (e) a movable piston in the housing and configured such that pressurized gas in the spring/gas chamber causes the piston to move in the housing to compress the fuel/gas mixture in the dual compression/combustion chamber; and (f) a driving blade connected to the piston such that the combustion of the compressed fuel/gas mixture causes the piston to move in the housing to cause the driving blade to drive a fastener.

The powered fastener driving tool of this example embodiment of the present disclosure also includes: (a) a pressurized gas source supported by the housing; (b) a pressurized gas inlet supported by the housing; (c) a removable fuel source supportable by the housing in a fuel source receipt area of the housing; (d) a fuel inlet supported by the housing; (e) an exhaust outlet supported by the housing; and (f) a spring supported by the housing and configured to partially support the piston in a resting position.

The method of operation or operational cycle of this example embodiment of the powered fastener driving tool of the present disclosure includes: (1) a first phase; (2) a second phase; and (3) a third phase. The first phase occurs when the tool is first turned on. In this first phase, the piston is positioned at a resting position or state in the housing. The second phase occurs when the WCE and the trigger are both actuated. In this second phase, after the WCE and the trigger are actuated, the spring/gas chamber fills with pressurized gas, and the dual compression/combustion chamber fills with a fuel/gas mixture. The pressurized gas in the spring/gas chamber causes the piston to move and compress the fuel/gas mixture in the dual compression/combustion chamber. The compressed fuel/gas mixture is then combusted, which in turn causes the piston to move in the housing to cause the driving blade to drive a fastener. The third phase occurs after the driving blade drives the fastener. In this third phase, the piston returns to the resting position so that the powered fastener driving tool can perform another operation cycle or be turned off.

Other objects, features, and advantages of the present disclosure will be apparent from the following detailed disclosure, taken in conjunction with the accompanying sheets of drawings, wherein like reference numerals refer to like parts.

BRIEF DESCRIPTION OF THE FIGURES

FIG. 2A is a diagrammatic view of part of the powered fastener driving tool of FIG. 1 showing the spring/gas chamber filling with pressurized gas when using the powered fastener driving tool after turning the tool on.

DETAILED DESCRIPTION

Figure 1:
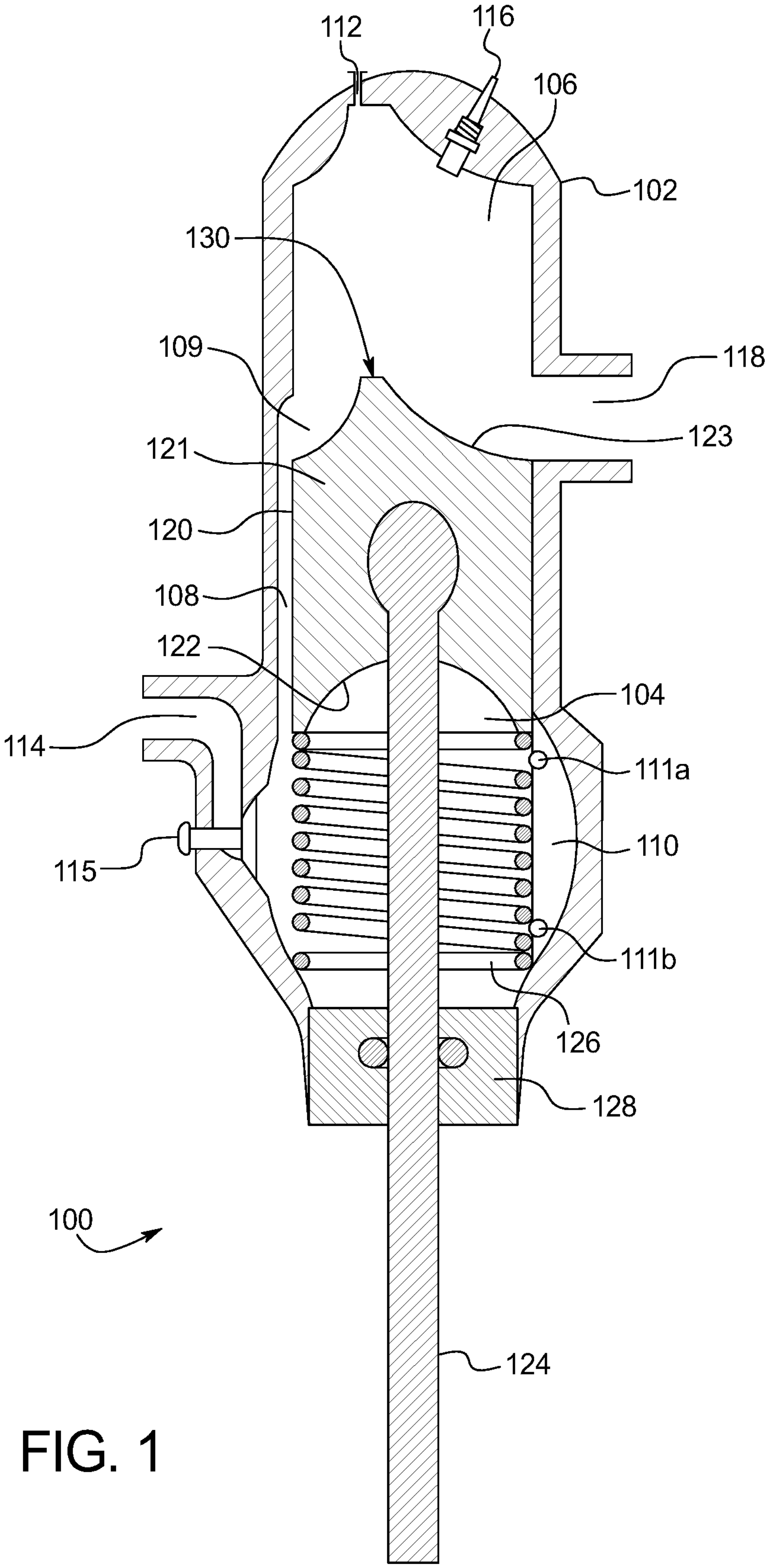
FIG. 1 is a diagrammatic view of part of a powered fastener driving tool of one example embodiment of the present disclosure, and shown in a non-operated state (where the piston is in a resting position).

While the features, devices, and apparatus described herein may be embodied in various forms, the drawings show and the specification describe certain exemplary and non-limiting embodiments. Not all of the components shown in the drawings and described in the specification may be required, and certain implementations may include additional, different, or fewer components. Variations in the arrangement and type of the components; the shapes, sizes, and materials of the components; and the manners of connections of the components may be made without departing from the spirit or scope of the claims. Unless otherwise indicated, any directions referred to in the specification reflect the orientations of the components shown in the corresponding drawings and do not limit the scope of the present disclosure. Further, terms that refer to mounting methods, such as coupled, mounted, connected, and the like, are not intended to be limited to direct mounting methods but should be interpreted broadly to include indirect and operably coupled, mounted, connected and like mounting methods. This specification is intended to be taken as a whole and interpreted in accordance with the principles of the present disclosure and as understood by one of ordinary skill in the art.

Various embodiments of the present disclosure provide a powered fastener driving tool including a first or spring/gas chamber in a housing and configured to contain pressurized gas that causes a piston in the housing to compress a fuel/gas mixture in a second or combustion chamber in the housing. The fuel/gas mixture is further combusted to provide necessary levels of power for driving fasteners such as nails while using less fuel. The powered fastener driving tool of the present disclosure is more efficient in either providing the same or a greater amount of power than various known combustion powered fastener driving tools.

Referring now to FIGS. 1, 2A, 2B, 3, 4, 5, and 6, a powered fastener driving tool of one example embodiment of the present disclosure is generally indicated by numeral 100. In this example embodiment of the present disclosure, the powered fastener driving tool 100 generally includes: (a) a housing 102; (b) a first or spring/gas chamber 104 in or defined in the housing 102; (c) a second or dual compression/combustion chamber 106 in or defined in the housing 102; (d) a gas communication channel 108 in or defined in the housing 102; (e) a gas reservoir 110 in or defined in the housing 102; (f) a fuel inlet 112 in or defined in the housing 102; (g) a gas inlet 114 in or defined in the housing 102; (h) an exhaust outlet 118 in or defined in the housing 102; (i) a driving blade opening (not shown) in or defined in the housing 102; (j) a movable piston 120 in the housing 102; (k) a driving blade 124 connected to the piston 120 and partially disposed in the housing 102; (l) a gas source (not shown) in, connected to, or partially supported by the housing 102; (m) a fuel source (not shown) in, connected to, or partially supported by the housing 102; (n) a biasing member such as a spring 126 in the housing 102; (o) an igniter 116 in, connected to, or partially supported by the housing 102; (p) a power source assembly or power supply assembly (not shown) in, connected to, or supported by the housing 102; (q) a fillable fastener magazine (not shown) connected or connectable to the housing 102; (r) a work piece contact element or nose (not shown) supported by the housing 102; (s) a valve sleeve (not shown) supported by the housing 102; (t) a trigger (not shown) supported by the housing 102; (u) a trigger switch (not shown) supported by the housing 102; and (v) a seal 128 supported by the housing 102.

More specifically, in this example illustrated embodiment of the present disclosure, the housing 102 at least partially defines each of the spring/gas chamber 104, the dual compression/combustion chamber 106, the gas communication channel 108, the gas reservoir 110, the fuel inlet 112, the gas inlet 114, the exhaust outlet 118, and the driving blade opening (not labeled).

In this illustrated example embodiment of the present disclosure, the spring/gas chamber 104 is configured to contain or be filled with pressurized gas as further discussed below. The spring/gas chamber 104 is also configured to enable the piston 120 to be movable at least partially within the spring/gas chamber 104. In certain embodiments of the present disclosure, the spring/gas chamber is fully or partially cylindrical.

In this illustrated example embodiment of the present disclosure, the dual compression/combustion chamber 106 is configured to contain the fuel/gas mixture as further discussed below. In other embodiments of the present disclosure, the dual compression/combustion chamber 106 is configured to contain pressurized gas, fuel, or a combination thereof. The dual compression/combustion chamber 106 is also configured to enable the piston 120 to be movable partially within the dual compression/combustion chamber 106.

Figure 2A:
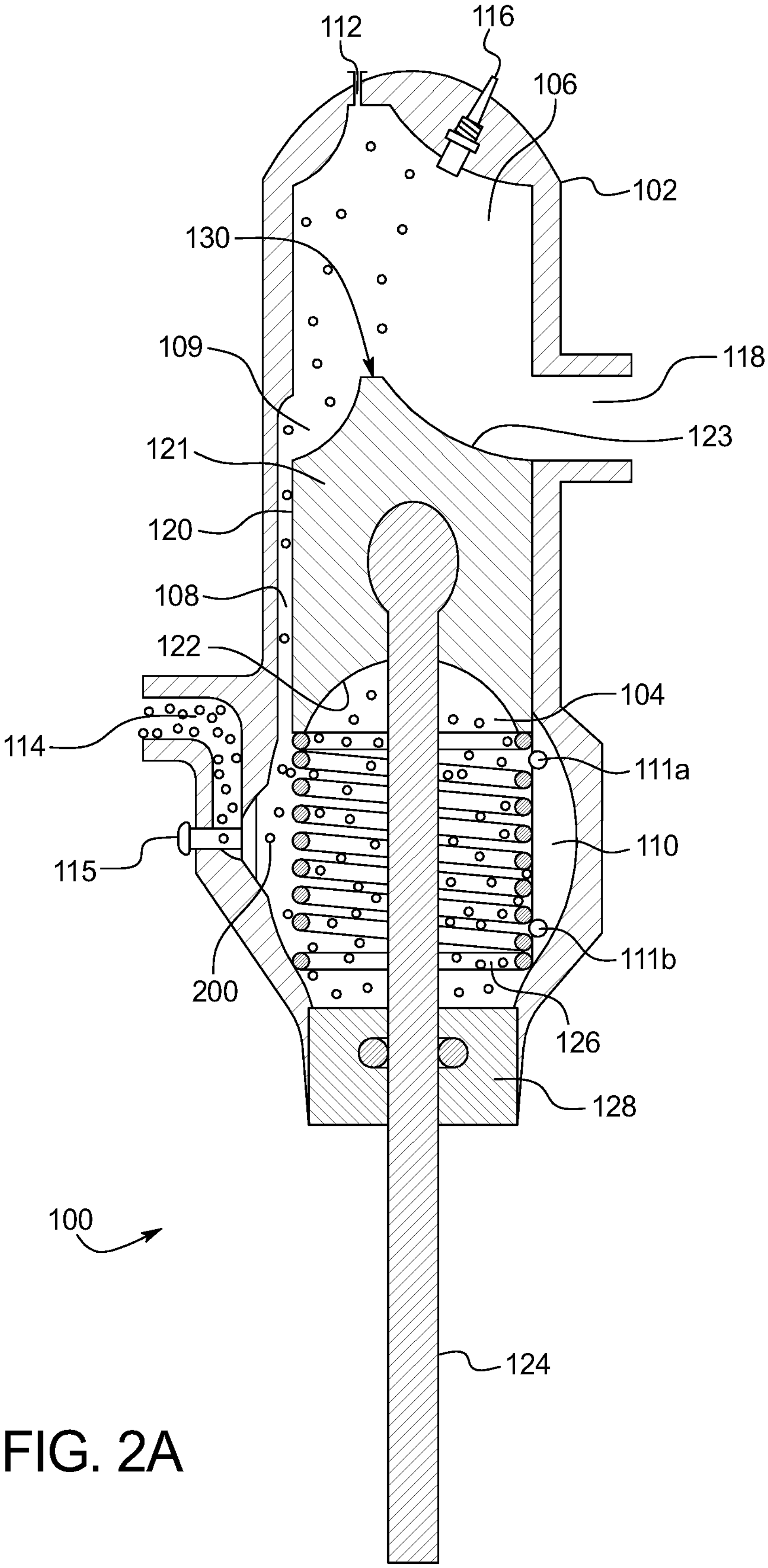
Figure 2B:
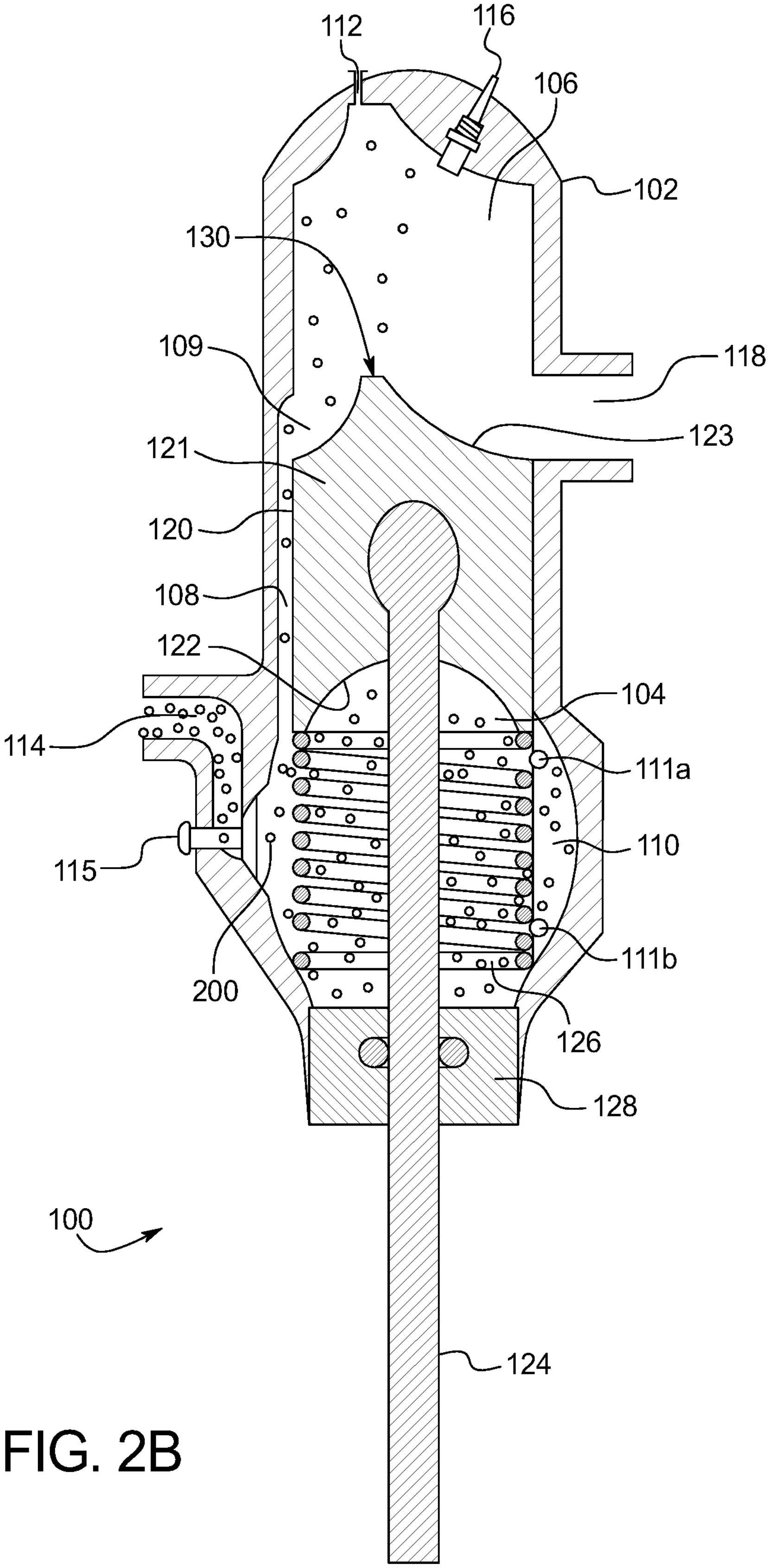
FIG. 2B is a diagrammatic view of part of the powered fastener driving tool of FIG. 1 showing the spring/gas chamber filling with pressurized gas after the powered fastener driving tool has completed an operation cycle.
Figure 3:
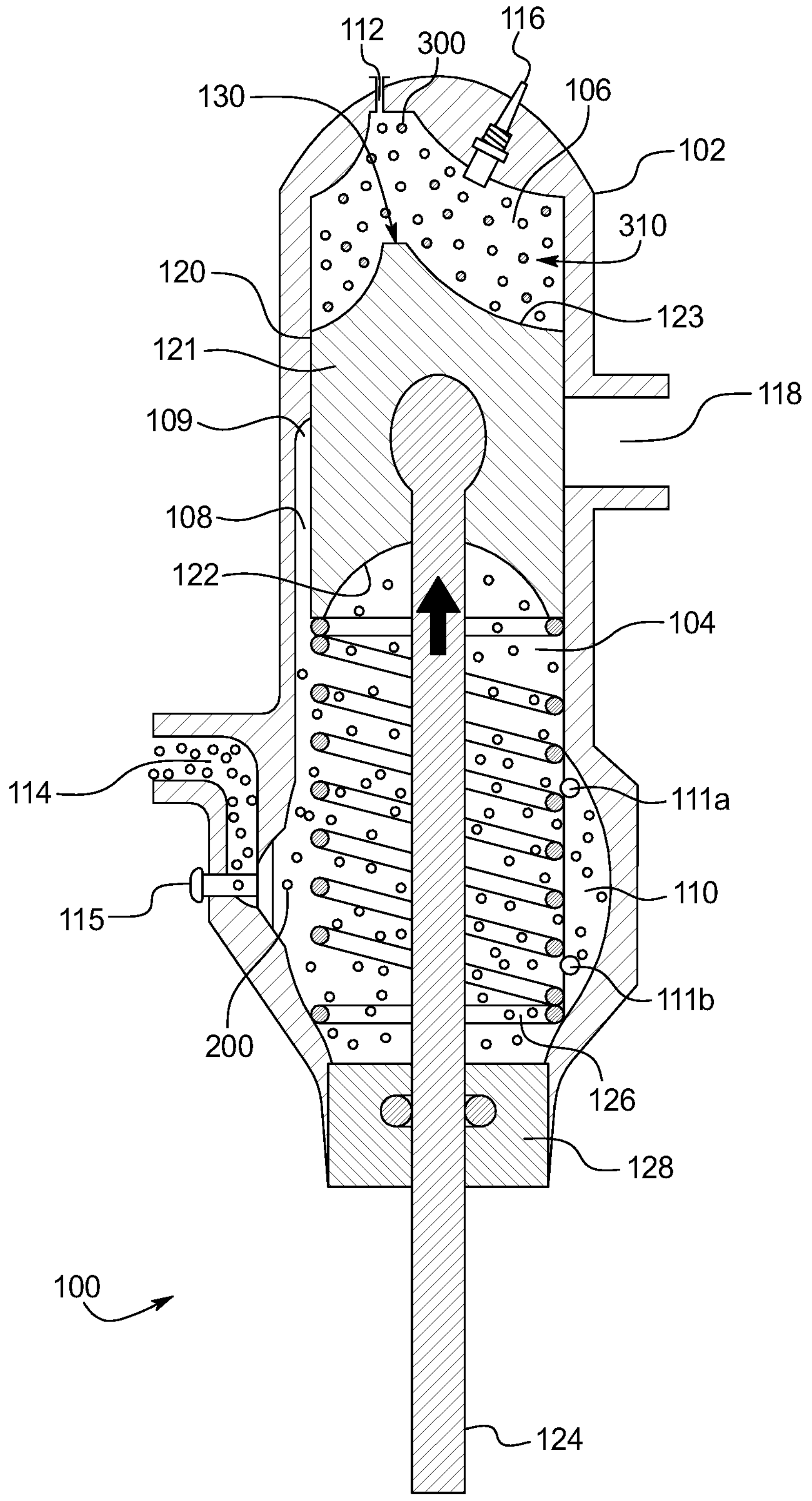
FIG. 3 is a diagrammatic view of part of the powered fastener driving tool of FIG. 1 showing that the pressurized gas in the spring/gas chamber has caused the piston to move from the resting position to a compression position.
Figure 4:
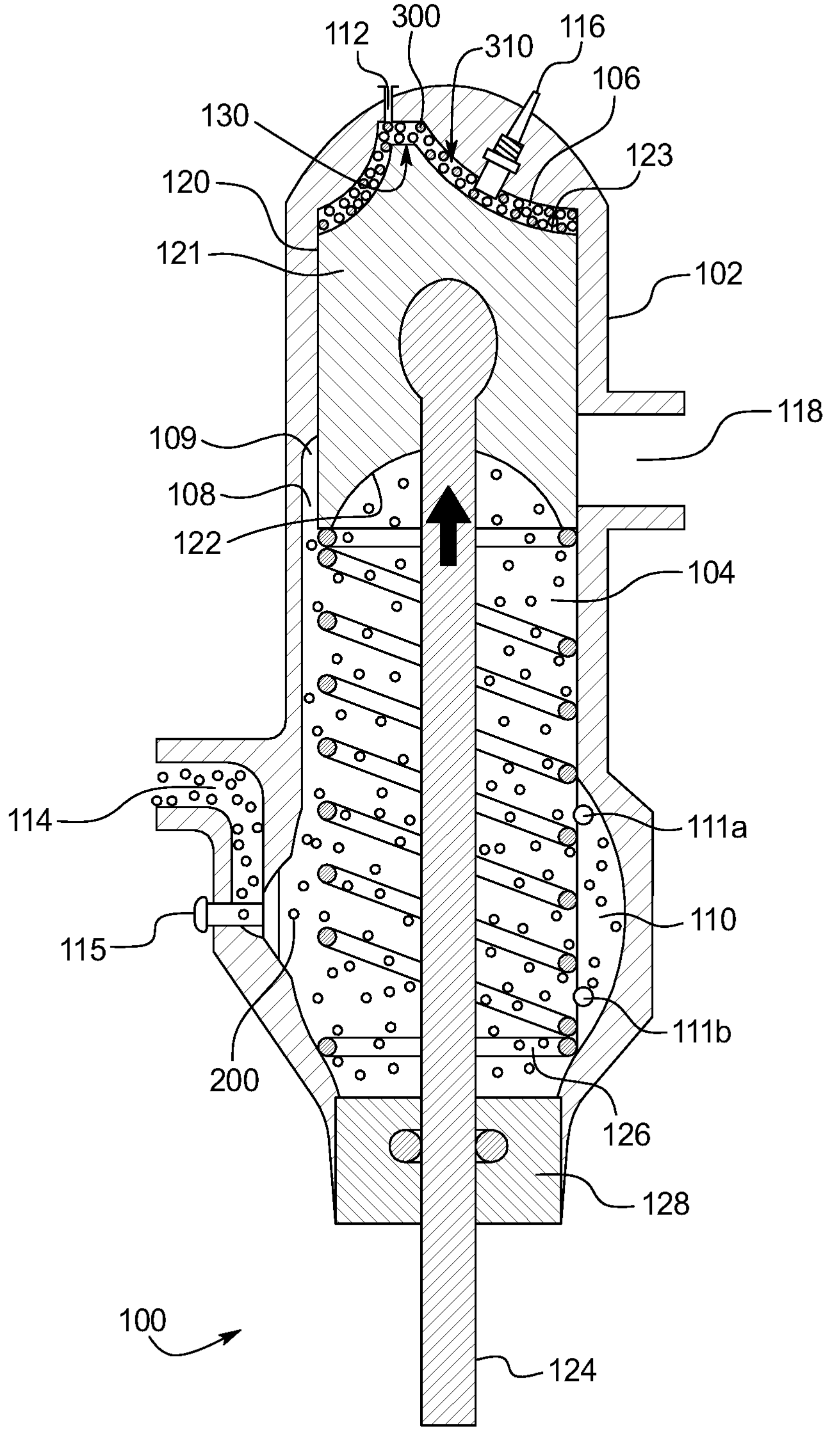
FIG. 4 is a diagrammatic view of part of the powered fastener driving tool of FIG. 1 showing the piston fully compressing a fuel/gas mixture in the dual compression/combustion chamber.
Figure 5:
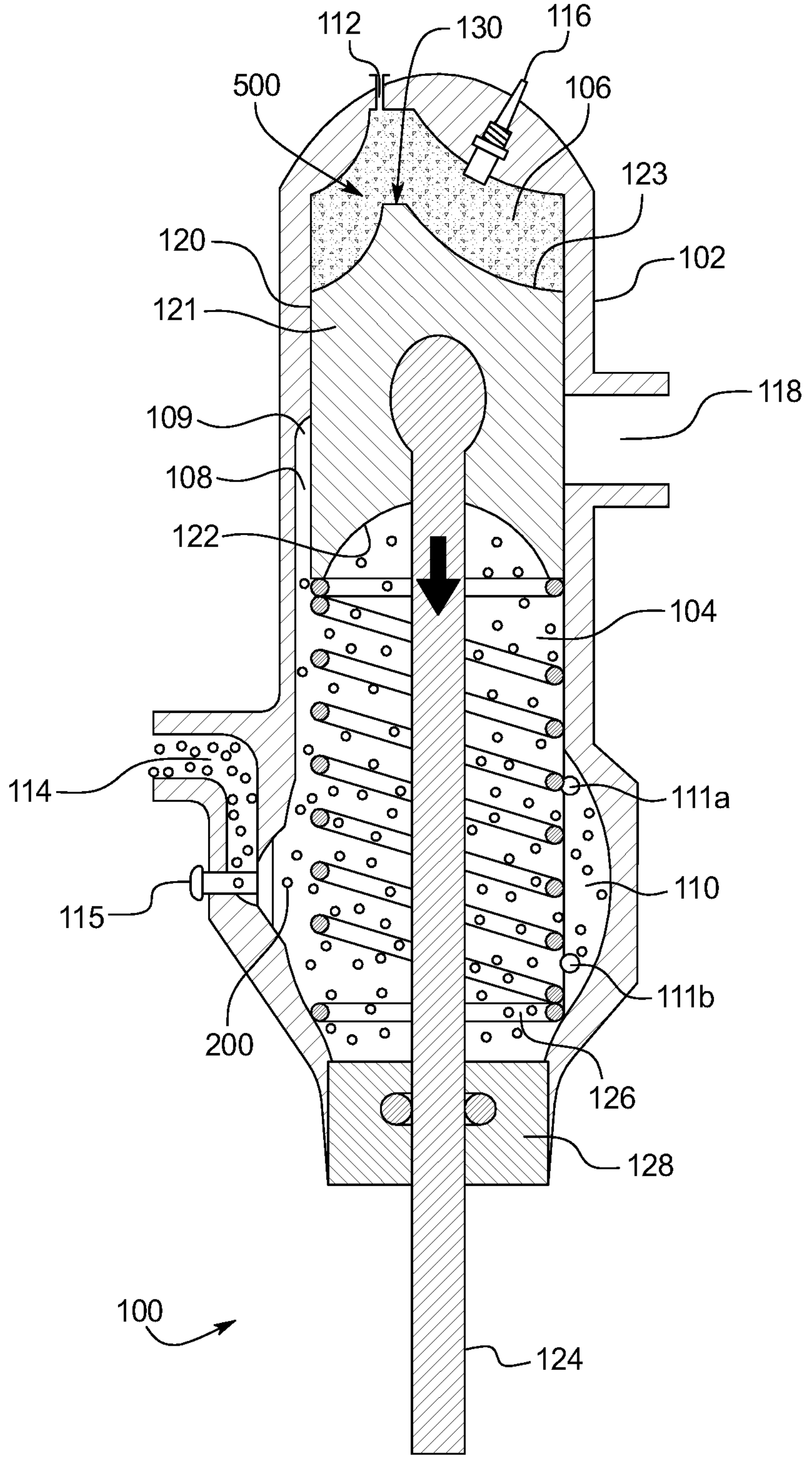
FIG. 5 is a diagrammatic view of part of the powered fastener driving tool of FIG. 1 showing that the combustion of the fuel/gas mixture has produced high-pressure combustion gases that cause the piston to move from the compression position to a firing position.

In this illustrated example embodiment of the present disclosure, the gas communication channel 108 selectively fluidly connects the spring/gas chamber 104 and the dual compression/combustion chamber 106 (as shown in FIGS. 1, 2A, 2B, and 6) as further discussed below. The gas communication channel 108 defines a connecting opening 109 where the gas communication channel 108 and the dual compression/combustion chamber 106 meet. The gas communication channel 108 is configured to communicate pressurized gas from the spring/gas chamber 104 to the dual compression/combustion chamber 104 via the connecting opening 109 when the piston 120 does not substantially block the connecting opening 109 (as shown in FIGS. 3, 4, and 5).

In this illustrated example embodiment of the present disclosure, the gas reservoir 110 is configured to contain or be filled with pressurized gas. The gas reservoir 110 includes an on/off valve 111*a* and a check valve 111*b*. The on/off valve 111*a* is configured to enable pressurized gas to move or flow from the gas reservoir 110 to the spring/gas chamber 104 as further discussed below. The check valve 111*b* is configured to enable pressurized gas to move or flow from the spring/gas chamber 104 to the gas reservoir 110 as further discussed below.

In this illustrated example embodiment of the present disclosure, the fuel inlet 112 fluidly connects the fuel source (now shown) and the dual compression/combustion chamber 106. The fuel inlet 112 is configured to communicate fuel from the fuel source to the dual compression/combustion chamber 106 as further discussed below.

In this illustrated example embodiment of the present disclosure, the gas inlet 114 selectively fluidly connects the gas source (not shown) and the spring/gas chamber 104 as further discussed below. The gas inlet 114 is configured to communicate pressurized gas from the gas source to the spring/gas chamber 104. The gas inlet 114 includes a check valve 115 at the end of the gas inlet 114 where the gas inlet 114 connects to the spring/gas chamber 104. This check valve 115 enables the gas inlet 114 to communicate pressurized gas from the gas source to the spring/gas chamber 104 in one direction. Thus, the gas source is configured to supply pressurized gas to the gas inlet 114, wherein the pressurized gas can move or flow through the gas inlet 114, through the check valve 115, and further into the spring/gas chamber 104.

In this illustrated example embodiment of the present disclosure, the exhaust outlet 118 is configured to enable high-pressure combustion gases formed from combusting the compressed fuel/gas mixture in the dual compression/combustion chamber 106 to exit from the dual compression/combustion chamber 106 as further discussed below.

In this illustrated example embodiment of the present disclosure, the driving blade opening (not labeled) is configured to enable the driving blade 124 to be movable through the driving blade opening. The inner diameter of the driving blade opening is the same size, slightly larger, or slightly smaller than the outer diameter of the driving blade 124 to manage gas seals in various example embodiments of the present disclosure.

Figure 6:
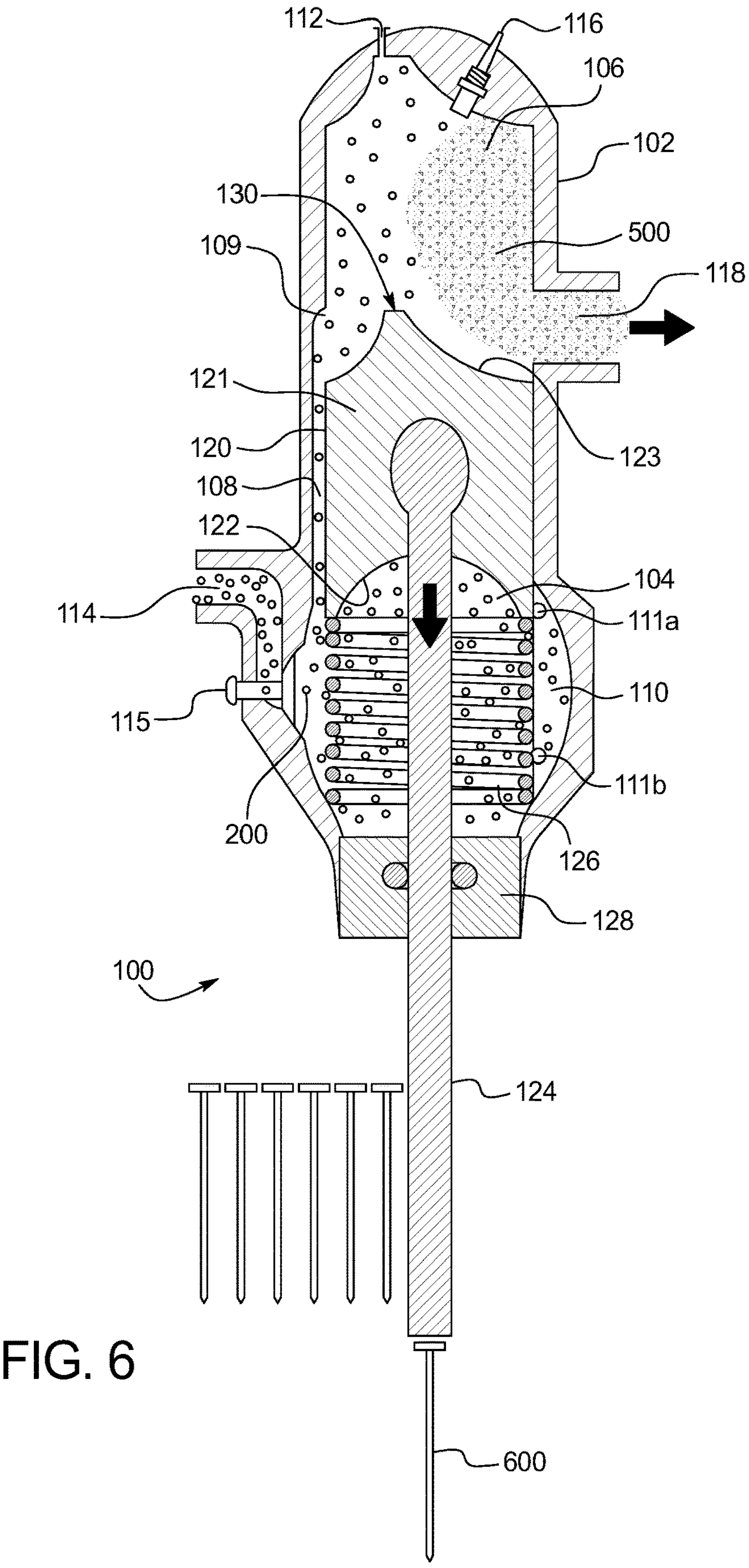
FIG. 6 is a diagrammatic view of part of the powered fastener driving tool of FIG. 1 showing the piston in the firing position and the driving blade driving a fastener.

In this illustrated example embodiment of the present disclosure, the piston 120 is configured to be movable in the housing 102. More specifically, the piston 120 is configured to: (1) compress the fuel/gas mixture in the dual compression/combustion chamber 106 as shown in FIGS. 3 and 4; (2) drive the driving blade 124 to strike fasteners, such as nails as shown in FIG. 6; and (3) block one or more elements or fluid communication channels defined by the housing 102, as further discussed below.

Since the piston 120 is movable in the housing 102, the piston 120 can be positioned in various positions during operation. For example, the piston 120 can be positioned in: (1) a resting position as shown in FIG. 1; (2) a plurality of compression positions such as shown in FIGS. 3 and 4; or (3) a firing position as shown in FIGS. 5 and 6 and as further discussed below. The piston 120 is positioned in the resting position when the powered fastener driving tool 100 is not performing a typical operation cycle (as best shown in FIG. 1). In this illustrated embodiment of the present disclosure, the piston 120 includes: (1) a partially cylindrically shaped body 121; (2) a first surface 122; (3) a second surface 123; and (4) a heel 130. The configuration and the function of the heel 130 are further discussed below. In various embodiments of the present disclosure, the piston 130 is shaped or configured to enable the fuel and air to mix uniformly and to enable relatively easy release of the exhaust gas. The fuel is injected from or through the fuel inlet 112 and spreads out in all directions on both sides of the curved horn or hill shaped heel. The hill shape of 130 matches the shape of part of the duel compression/combustion chamber. The position of the igniter 116 facilitates the generation of high explosive forces to push the piston to strike a fastener. The illustrated configuration or slope of the piston helps to cause the release of the exhaust gas once the respective part of the piston reaches the exhaust outlet 118. The gas communication channel 108 can in certain embodiments of the present disclosure generate high speed gas momentum to push the exhaust out and generate convection mixing force for fuel/air mixing in the combustion chamber. In certain embodiments of the present disclosure, the piston can be considered to move into or to partially define each of: (a) the spring/gas chamber 104; and (b) the dual compression/combustion chamber 106. In certain such embodiments, the first surface 122 of the piston 120 can partially define the spring/gas chamber 104, and the second surface 123 of the piston 120 can partially define the dual compression/combustion chamber 106.

In this illustrated example embodiment of the present disclosure, the driving blade 124 is configured to strike fasteners such as fastener 600.

In this illustrated example embodiment of the present disclosure, the gas source is configured to contain pressurized gas and provide pressurized gas to the gas inlet 114. The gas source can include a mini gas pump or blower or a gas tank or container storing pressurized gas.

In this illustrated example embodiment of the present disclosure, the fuel source is configured to contain fuel and inject a metered dose of the fuel into the fuel inlet 112.

In this illustrated example embodiment of the present disclosure, the fuel source includes a fuel cell containing a suitable propellant.

In other example embodiments of the present disclosure, the fuel source can include a liquid fuel bag.

In certain example embodiments of the present disclosure, pressurized gas from the gas source compresses the liquid fuel bag and injects a metered dose of fuel into the fuel inlet 112.

In this illustrated example embodiment of the present disclosure, the spring 126 is configured to partially support the piston 120. The spring 126 is partially positioned adjacent to the first surface 122 of the piston 120.

In this illustrated example embodiment of the present disclosure, the igniter 116 is electrically connected to the power source. The power source produces a spark for ignition by the igniter 116. This spark combusts the fuel/gas mixture in the dual compression/combustion chamber 106 to produce high-pressure gases.

In this illustrated example embodiment of the present disclosure, the fastener magazine is configured to hold a plurality of fasteners that are driven by the driving blade 124 during a typical operation cycle.

As described above, the WCE is configured to engage or contact a workpiece and to operatively work with a trigger mechanism as is known in the industry such that the WCE needs to be depressed or move inwardly a predetermined distance with respect to the housing 102 before activation of the trigger mechanism causes actuation of the powered fastener driving tool 100. In this example embodiment of the present disclosure, the trigger mechanism includes: (1) a trigger (not shown); and (2) a trigger switch (not shown). When the WCE engages the workpiece, one or more mechanical linkages (not shown) causes a valve sleeve (not shown) to open the spring/gas chamber 104, which causes the gas source to provide pressurized gas to the gas inlet 114 and further to the spring/gas chamber 104.

In this illustrated example embodiment of the present disclosure, the seal 128 is configured to partially enclose the spring/gas chamber 104. The seal 128 partially defines the driving blade opening through which the driving blade can move to strike a fastener during an operation cycle.

Method of Operation

The method of operating the powered fastener driving tool 100 of the present disclosure includes completing an operation cycle. The operation cycle generally in various embodiments of the present disclosure includes: (1) a first phase; (2) a second phase; and (3) a third phase.

In the first phase, the powered fastener driving tool 100 is turned on or put in an "on" configuration. When in this configuration, the piston 120 is positioned in the resting position in the housing (as best shown in FIG. 1). More specifically, the first surface 122 of the piston engages the spring 126 such that the spring 126 slightly compresses to maintain the piston 120 in the resting position. The piston 120 is also positioned in the housing 102 such that the body 121 of the piston 120 does not block or substantially block the gas inlet check valve 115. In such case, pressurized gas 200 can move or flow from the gas inlet 115 into the spring/gas chamber 104. Additionally, the body 121 of the piston 120 does not block or substantially block the exhaust outlet 118. In such case, pressurized gas 200 can move or flow out of the dual compression/combustion chamber 106 via the exhaust outlet 118. Furthermore, the body 121 of the piston 120 does not block or substantially block the connecting opening 109. In such case, pressurized gas 200 can move or flow from the spring/gas chamber 104, through the gas communication channel 108, and further into the dual compression/combustion chamber 106. Furthermore, the body 121 of the piston 120 does not block or substantially block the gas reservoir check valve **111*b* or the gas reservoir on/off valve 111*a*. In such case, pressurized gas 200 can move or flow from the spring/gas chamber 104 to the gas reservoir 110** and/or vice versa, as further described below.

During the second phase, the method further includes: (a) the WCE engaging a workpiece; (b) the spring/gas chamber 104 filling with pressurized gas such that the pressure in the spring/gas chamber 104 substantially increases; (c) the pressurized gas in the spring/gas chamber 104 causing the piston 120 to move from the resting position to the plurality of compression positions; (d) the dual compression/combustion chamber 106 filling with pressurized gas and fuel such that a fuel/gas mixture forms in the dual compression/combustion chamber 106; (e) the piston 120 further moving to the compression positions to compress the fuel/gas mixture in the dual compression/combustion chamber 106; (f) the power source providing a spark to the igniter 116 to combust the compressed fuel/gas mixture in the dual compression/combustion chamber 106; and (g) the spark combusting the fuel/gas mixture to produce high-pressure combustion gases that expand and cause the piston 120 to move from the highest compression position achieved to the firing position, thereby causing the driving blade 124 to drive a fastener 600.

More specifically, while the powered fastener driving tool 100 is in the "on" configuration, the WCE engages a workpiece (not shown). As described above, the WCE is configured to engage or contact a workpiece and to operatively work with a trigger mechanism such that the WCE needs to be depressed or move inwardly a predetermined distance with respect to the housing before activation of the trigger mechanism causes actuation of the powered fastener driving tool 100. In this illustrated example embodiment of the present disclosure, the trigger mechanism includes: (1) a trigger; and (2) a trigger switch. When the WCE engages the workpiece, one or more mechanical linkages causes a valve sleeve to open the spring/gas chamber 104, which causes the gas source to begin providing pressurized gas to the gas inlet 114 and further to the spring/gas chamber 104.

Upon pressurized gas 200 filling the spring/gas chamber 104, the pressure within the spring/gas chamber 104 substantially increases. In various example embodiments of the present disclosure, the pressure within the spring/gas chamber 104 can increase by: (1) filling the spring/gas chamber 104 with pressurized gas 200 provided by the gas source (as shown in FIG. 2A); or (2) filling the spring/gas chamber 104 with pressurized gas 200 provided by the gas source and the gas reservoir 110 (as shown in FIG. 2B). Either scenario occurs depending on how many typical operation cycles the powered fastener driving tool 100 has performed while the powered fastener driving tool 100 is in the "on" configuration. For continuous firing or bump fire, the gas storage tank 110 coordinates with pressurized gas inlet 114. When piston 121 moves to strike the fastener, the check valve 111*b* open to store the sudden high pressure gas. Once the piston 121 moves back, the on/off valve 111*a* valve opens to release the high pressure to incorporate with the 114. The whole process reduces the consumption of the gas from the gas source and increases the cycle efficiency.

Referring now to FIG. 2A, in this illustrative example embodiment of the present disclosure, the powered fastener driving tool 100 has been turned on but has not yet performed a typical operation cycle. In other words, this method describes using the powered fastener driving tool 100 for the first time after the powered fastener driving tool 100 has been in the "on" configuration. In such case, the gas reservoir 110 does not contain any pressurized gas; pressurized gas does not move or flow from the gas reservoir 110, through the gas reservoir on/off valve 111*a*, and further into the spring/gas chamber 104. Additionally, pressurized gas does not move or flow from the spring/gas chamber 104, through the gas reservoir check valve 111*b*, and further into the gas reservoir 110. It should be appreciated that the gas reservoir on/off valve 111*a* can be open at this moment, even when no pressurized gas moves or flows into or out of the gas reservoir 110.

Still referring to FIG. 2A, during a typical operation cycle, the gas source provides pressurized gas 200 to the gas inlet 114. The pressurized gas moves or flows through the gas inlet 114, through the gas inlet check valve 115, and further into the spring/gas chamber 104. As the pressurized gas 200 fills the spring/gas chamber 104, the pressure inside the spring/gas chamber 104 increases. The increasing amount of pressurized gas 200 in the spring/gas chamber 104 causes the piston 120 to move in the housing 102. More specifically, the pressurized gas 200 in the spring/gas chamber 104 causes the piston 120 to move from the resting position to one of the compression positions (i.e., toward and into the dual compression/combustion chamber 106). Thus, the pressurized gas 200 in the spring/gas chamber 104 increases the pressure in the spring/gas chamber 104 substantially such that the increase in pressure causes the piston 120 to move from the resting position to that compression position.

Now referring to FIG. 2B, if the powered fastener driving tool 100 has been in the "on" configuration and has completed more than one typical operation cycle, the gas reservoir 110 can contain pressurized gas 200 from a previous typical operation cycle. Furthermore, the gas reservoir 110 can coordinate with the act of pressurized gas coming out of the gas inlet 114 to ensure continuous firing or pump fire. More specifically, the method includes the gas reservoir on/off valve 111*a* being open. During a typical operation cycle, the gas source provides pressurized gas 200 to the gas inlet 114. The pressurized gas moves or flows through the gas inlet 114, through the gas inlet check valve 115, and further into the spring/gas chamber 104. Additionally, if the gas reservoir 110 contains pressurized gas 200 from a previous typical operation cycle, the pressurized gas 200 in the gas reservoir 110 moves or flows from the gas reservoir 110, through the gas reservoir on/off valve 111*a*, and further into the spring/gas chamber 104. Thus, when in the "on" configuration and performing a typical operation cycle after the powered fastener driving tool 100 has previously performed one or more typical operation cycles, the spring/gas chamber 104 can fill with pressurized gas 200 from the gas source, pressurized gas from the gas reservoir 110, or a combination thereof. Pressurized gas 200 from the gas source and pressurized gas 200 from the gas reservoir 110 increase the pressure in the spring/gas chamber 104 substantially such that the increase in pressure causes the piston 120 to move from the resting position to one of the compression positions (i.e., toward the dual compression/combustion chamber 106).

Referring now to FIGS. 2A, 2B, and 3, as the pressure in the spring/gas chamber 104 substantially increases and the increasing amount of pressurized gas 200 causes the piston 120 to move from the resting position to a further one of the compression positions, pressurized gas 200 in the spring/gas chamber 104 moves or flows from the spring/gas chamber 104, through the gas communication channel 108, and further into the dual compression/combustion chamber 106. The pressurized gas from the spring/gas chamber 104 moves or flows to the dual compression/combustion chamber 106 via the gas communication channel 108 while the body 121 of the piston 120 does not substantially block the connecting opening 109.

At some point during the piston's 120 movement from the resting position to one of the compression positions, the body 121 of the piston 120 substantially blocks the connecting opening 109. In such case, the pressurized gas 200 cannot further move from the spring/gas chamber 104 to the dual compression/combustion chamber 106 via the gas communication channel 108. Additionally, as the piston 120 moves from the resting position to a further one of the compression positions, the body 121 of the piston 120 substantially blocks the exhaust outlet 118. In such case, pressurized gas 200 and/or any other substance(s) in the dual compression/combustion chamber 106 cannot exit the dual compression/combustion chamber 106 through the exhaust outlet 118.

When the body 121 of the piston 120 substantially blocks the exhaust outlet 118, the fuel source injects a metered dose of fuel 300 into the fuel inlet 112. The fuel 300 further moves or flows into the dual compression/combustion chamber 106. The fuel 300 mixes with the pressurized gas 200 that moved or flowed from the spring/gas chamber 104 to the dual compression/combustion chamber 106 via the gas communication channel 108 to form the fuel/gas mixture 310.

While fuel 300 enters the dual compression/combustion chamber 106 and mixes with pressurized gas 200, the pressure in the spring/gas chamber 104 continues to increase due to the gas source and/or the gas reservoir 110 continuing to provide pressurized gas 200 to the spring/gas chamber 104. Consequently, the pressure continues to increase in the spring/gas chamber 104, which in turn continues to cause the piston 120 to move to a further combustion position (as best shown in FIG. 3). As best shown in FIG. 4, the pistons 120 movement to further combustion positions substantially decreases the volume of the dual compression/combustion chamber 106 such that the pressure exerted by the fuel/gas mixture 310 in the dual compression/combustion chamber 106 increases. Thus, the piston 120 compresses the fuel/gas mixture 310 in the dual compression/combustion chamber 106. In other words, the increasing amount of pressurized gas 200 in the spring/gas chamber 104 causes the piston 120 to move from the resting position to sequentially greater compression positions to compress the fuel/gas mixture 310 in the dual compression/combustion chamber 106.

Referring now to FIGS. 5 and 6, when the pressure exerted by the fuel/gas mixture 310 in the dual compression/combustion chamber 106 reaches a desired pressure (e.g., such as greater than 15 psi), the power source electrically connected to the igniter 116 supplies a spark (not shown) to the igniter 116. The igniter 116 further provides the spark to the dual compression/combustion chamber 106. Consequently, the compressed fuel/gas mixture 310 in the dual compression/combustion chamber 106 combusts and produces high-pressure combustion gases 500 that expand. Expansion of the high-pressure combustion gases 500 causes the piston 120 to move from the higher compression position achieved to the firing position.

As the piston 120 moves from the combustion position to the firing position, there is a generation of sudden high pressure of pressurized gas 200 in the spring/gas chamber 104 This occurs because as the piston 120 moves to the firing position, the volume of the spring/gas chamber 104 decreases while the pressurized gas 200 in the spring/gas chamber 104 cannot, at first, move or flow out of the spring/gas chamber 104. However, at this point, the check valve 111*b* opens. So, as the piston 120 moves from the combustion position to the firing position, some excess pressurized gas 200 in the spring/gas chamber 104 moves into the gas reservoir 110 via the gas reservoir check valve 111*b* due to the momentum of the piston's 120 movement to the firing position (the gas reservoir on/off valve 111*a* is closed to prevent pressurized gas 200 from moving or flowing out of the gas reservoir 110 and into the spring/gas chamber 104). Consequently, the pressure exerted by the pressurized gas 200 in the spring/gas chamber 104 decreases. This creates a larger difference in pressure between the dual compression/combustion chamber 106 and the spring/gas chamber 104, thus assisting the piston 120 in moving from the combustion position to the firing position. The excess pressurized gas 200 stored in the gas reservoir 110 can be used for future operation cycles, as discussed below.

As the piston 120 moves to the firing position, the piston 120 engages the spring 126. The spring 126 compresses when the first surface 122 of the piston 120 engages the spring. Movement of the piston 120 further causes the driving blade 124 to move through the driving blade opening. The driving blade further moves through the driving blade opening to strike a fastener 600 held in place by the fastener magazine. Thus, the high-pressure combustion gases 500 produced from combusting the compressed fuel/gas mixture 310 in the dual compression/combustion chamber 106 causes the piston 120 to move from the highest compression position achieved to the firing position, thereby causing the driving blade 124 to strike the fastener 600.

Additionally, as the piston 120 moves from the highest compression position achieved to the firing position, the piston 120 moves past the exhaust outlet 118. In other words, the body 121 of the piston 120 no longer substantially blocks the exhaust outlet. In such case, the high-pressure combustion gases 500 produced from combusting the fuel/gas mixture 310 in the dual compression/combustion chamber 106 substantially exits the dual compression/combustion chamber 106 via the exhaust outlet 118.

After striking the fastener 600, the powered fastener driving tool 100 completes the third phase. More specifically, the piston 120 returns to the resting position (as best shown in FIG. 1). Upon the piston 120 returning to the resting position, the gas reservoir on/off valve 111*a* opens. The gas reservoir 110 releases pressurized gas 200 into the spring/gas chamber 104 to assist in moving the piston 120 back to the resting position. Additionally, since the piston 120 moves past the connecting opening 109 when moving to the firing position, the body 121 of the piston 120 no longer substantially blocks the connecting opening 109. In such case, some of the excess pressurized gas 200 in the spring/gas chamber 104 does not move or flow into the gas reservoir 110. Instead, some of the excess pressurized gas 200 in the spring/gas chamber 104 moves or flows into the gas communication channel 108 and further into the dual compression/combustion chamber 106 while the piston 120 is in the firing position and the body 121 of the piston 120 is not blocking the connecting opening 109. Consequently, the pressurized gas 200 moving or flowing into the dual compression/combustion chamber 106 increases the pressure slightly in the dual compression/combustion chamber 106. Therefore, when the piston 120 moves from the firing position to the resting position after the driving blade 124 strikes the fastener 600, this slight increase in pressure in the dual compression/combustion chamber 106 assists in reducing piston recoil. In other words, the pressurized gas that moves or flows from the spring/gas chamber 104 to the dual compression/combustion chamber 106 while the piston 120 is in the firing position assists in reducing the piston recoil or kick back when the piston 120 further moves from the firing position to the resting position.

When the piston 120 returns to the resting position, the pressure in the spring/gas chamber 104 generally returns to a pressure that was present before performing the operation cycle. The pressure in the dual compression/combustion chamber 106 also generally returns to a pressure that was present before performing the operation cycle. At such point, the powered fastener driving tool 100 is ready to perform another operation cycle.

It should be appreciated that in this illustrated example embodiment of the present disclosure, the piston 120 includes a heel 130. The heel 130 is connected to and extends from the second surface 123 of the piston 120. The heel 130 includes sloped walls extending from its base to its apex. The heel 130 is configured to alter the direction of movement of gas molecules that move or flow in the dual compression/combustion chamber 106. More specifically, in this illustrated example embodiment, when the piston 120 moves from the highest compression position achieved to the firing position after combusting the compressed fuel/gas mixture 310 in the dual compression/combustion chamber 106, the body 121 of the piston 120 does not substantially block the exhaust outlet 118. Therefore, high-pressure combustion gases 500 formed from combusting the fuel/gas mixture 310 can exit the dual compression/combustion chamber 106 via the exhaust outlet 118. Generally, as described above, some excess pressurized gas 200 in the spring/gas chamber 104 moves or flows from the spring/gas chamber 104, through the gas communication channel 108, and further into the dual compression/combustion chamber 106 when the piston 120 moves from the highest compression position achieved to the firing position. To minimize the amount of this pressurized gas 200 from exiting the dual compression/combustion chamber 106 via the exhaust outlet 118 when the body 121 of the piston 120 does not substantially block the exhaust outlet 118, the heel 130 of the piston 120 causes the pressurized gas 200 to move or deflect at an angle away from the exhaust outlet 118. In other words, when the pressurized gas 200 engages the sloped side of the heel 130 of the piston 120, the pressurized gas 200 is deflected at an angle away from the exhaust outlet 118 such that the pressurized gas 200 does not generally exit the dual compression/combustion chamber 106 via the exhaust outlet 118. It should be appreciated that the heel 130 of the piston

120 can have another suitable shape that is configured to deflect the pressurized gas at an angle away from the exhaust outlet.

It should be appreciated that in various example embodiments of the present disclosure, the relative spring compression forces are much smaller than the piston firing forces. In other words, the spring is configured to not impede or substantially impede the piston's downwardly movement toward the nose piece.

It should further be appreciated that in various example embodiments of the present disclosure, when completing more than one operation cycle of the powered fastener driving tool of the present disclosure, the pressurized gas filling the spring/gas chamber and the high-pressure combustion gases exiting the dual compression/combustion chamber via the exhaust outlet removes heat from the powered fastener driving tool. In such case, the movement of pressurized gas into the spring/gas chamber and of high-pressure combustion gases out of the dual compression/combustion chamber at least partially cools down the powered fastener driving tool and reduces the heat effect on the magazine.

It should further be appreciated that the pressurized gas can be atmospheric air, oxygen gas, or other suitable gaseous molecules or mixtures.

It should be appreciated that the pressurized gas can free from fuel, and that the fuel can be alternatively provided to the compression/combustion chamber from another source to mix with the pressurized gas in the compression/combustion chamber.

It should further be appreciated that the fuel can be an alcohol, alkane, alkene, alkyne, or any other suitable gaseous and liquid combustible fuels.

It should further be appreciated that the piston movement assistance chamber, the gas communication channel, and/or the dual compression/combustion gas chamber can either have a fixed or variable volume in various alternative example embodiments.

It should thus be appreciated from the above, that in various embodiments of the present disclosure, the powered fastener driving tool comprises: (a) a housing; (b) a first or spring/gas chamber in the housing configured to contain pressurized gas; (c) a second or dual compression/combustion chamber in the housing configured to contain a fuel/gas mixture; (d) a gas communication channel in the housing fluidly connecting the spring/gas chamber and the dual compression/combustion chamber; (e) a movable piston in the housing such that pressurized gas in the spring/gas chamber can cause the piston to move in the housing to compress the fuel/gas mixture in the dual compression/combustion chamber; and (f) a driving blade connected to the piston such that combustion of the compressed fuel/gas mixture can cause the piston to move in the housing to cause the driving blade to drive a fastener.

In various such embodiments of the powered fastener driving tool, the piston partially defines the spring/gas chamber.

In various such embodiments of the powered fastener driving tool, the piston partially defines the dual compression/combustion chamber.

In various such embodiments of the powered fastener driving tool, a first surface of the piston defines the piston movement assistance chamber.

In various such embodiments of the powered fastener driving tool, a second surface of the piston defines the dual compression/combustion chamber.

In various such embodiments of the powered fastener driving tool, the housing includes a gas reservoir.

In various such embodiments of the powered fastener driving tool, the gas reservoir is configured to contain pressurized gas.

In various such embodiments of the powered fastener driving tool, the gas reservoir is configured to release pressurized gas when the piston is moving from a resting position to one of a plurality of compression positions, such that the pressurized gas assists in moving the piston to said compression position.

In various such embodiments of the powered fastener driving tool, pressurized gas can move from the spring/gas chamber to the gas reservoir when the piston is moving from one of the compression positions to a firing position to decrease the pressure in the spring/gas chamber, thereby assisting the piston in moving from said compression position to the firing position.

In various such embodiments of the powered fastener driving tool, the gas reservoir is configured to release pressurized gas into the spring/gas chamber when the piston is moving from a firing position to a resting position, said pressurized gas movement assisting the piston in moving from the firing position to the resting position.

In various such embodiments of the powered fastener driving tool, the gas communication channel is configured to contain pressurized gas moving from the spring/gas chamber to the dual compression/combustion.

In various such embodiments of the powered fastener driving tool, the communication channel is configured to contain pressurized gas moving from the spring/gas chamber to the dual compression/combustion chamber when the piston moves from a firing position to a resting position, the pressurized gas increasing the pressure in the dual compression/combustion chamber to reduce recoil of the piston.

In various such embodiments of the powered fastener driving tool, the housing partially supports: (a) a pressurized gas source; (b) a pressurized gas inlet; (c) a fuel source; (d) a fuel inlet; (e) an exhaust outlet; and (f) a spring configured to partially support the piston in a resting position.

In various such embodiments of the powered fastener driving tool, the piston includes a heel connected to and extending from a first surface, the heel configured to move pressurized gas at an angle away from an exhaust outlet.

It should further thus be appreciated from the above, that in various embodiments of the present disclosure, the powered fastener driving tool has an operation cycle or a method of operation that includes: (a) the WCE engaging a workpiece; (b) the spring/gas chamber receiving or filling with pressurized gas such that the pressure in the spring/gas chamber substantially increases; (c) the pressurized gas in the spring/gas chamber causing the piston to move from a resting position to a compression position; (d) the dual compression/combustion chamber receiving or filling with pressurized gas and fuel such that a fuel/gas mixture forms in the dual compression/combustion chamber; (e) the piston further moving to the compression position to compress the fuel/gas mixture in the dual compression/combustion chamber; (f) the power source providing a spark to an igniter to combust the fuel/gas mixture in the dual compression/combustion chamber; (g) the spark combusting the fuel/gas mixture to produce high-pressure combustion gases that expand and cause the piston to move from the compression position to a firing position, thereby causing the driving blade to drive a fastener; (h) and the piston moving from the firing position to the resting position.

It will be understood that modifications and variations may be effected without departing from the scope of the novel concepts of the present invention, and it is understood that this application is to be limited only by the scope of the claims.

The invention is claimed as follows:

1. A powered fastener driving tool comprising:

a housing;

a combustion chamber in the housing;

a piston movable in the housing, the piston including a hill shaped heel movable in the combustion chamber, wherein the heel includes a top surface, a downwardly extending first side surface, and a downwardly extending second side surface; and a driving blade connected to the piston and configured to engage and drive a fastener, wherein the housing includes a surface configured to be engaged by and mate with the top surface of the heel, a first surface configured to be engaged by and mate with the first side surface of the heel, and a second surface configured to be engaged by and mate with the second side surface of the heel.

2. The powered fastener driving tool of claim 1, wherein the piston partially defines the combustion chamber.

3. The powered fastener driving tool of claim 1, wherein the housing defines an exhaust outlet closable by the piston.

4. The powered fastener driving tool of claim 3, wherein the heel is configured to move pressurized gas at an angle away from the exhaust outlet.

5. The powered fastener driving tool of claim 1, which includes a spring configured to bias the piston into the combustion chamber.

6. The powered fastener driving tool of claim 1, wherein the downwardly extending first side surface is concave and the downwardly extending second side surface is concave.

7. The powered fastener driving tool of claim 6, wherein the first surface of the housing is convex and the second surface of the housing is convex.

8. The powered fastener driving tool of claim 1, wherein the downwardly extending first side surface is curved.

9. The powered fastener driving tool of claim 8, wherein the first surface of the housing is curved.

10. The powered fastener driving tool of claim 1, wherein the downwardly extending first side surface is concave.

11. The powered fastener driving tool of claim 10, wherein the first surface of the housing is convex surface.

12. A powered fastener driving tool comprising:

a housing;

a combustion chamber in the housing;

a piston movable in the housing, the piston including a hill shaped heel movable in the combustion chamber, wherein the heel includes a flat top surface, a first curved side surface, and a second curved side surface; and a driving blade connected to the piston and configured to engage and drive a fastener, wherein the housing includes a surface configured to be engaged by and mate with the flat top surface of the heel, a first curved surface configured to be engaged by and mate with the first curved side surface of the heel, and a second curved surface configured to be engaged by and mate with the second curved side surface of the heel.

13. The powered fastener driving tool of claim 12, wherein the housing includes a gas inlet that extends through the surface of the housing configured to be engaged by and mate with the flat top surface of the heel.

14. A powered fastener driving tool comprising:

a housing;

a combustion chamber in the housing;

a piston movable in the housing, the piston including a hill shaped heel movable in the combustion chamber, wherein the heel includes a top surface, a first concave side surface, and a second concave side surface; and a driving blade connected to the piston and configured to engage and drive a fastener, wherein the housing includes a surface configured to be engaged by and mate with the top surface of the heel, a first convex surface configured to be engaged by and mate with the first concave side surface of the heel, and a second convex surface configured to be engaged by and mate with the second concave side surface of the heel.

* * * * *